W. C. OSTERHOLM.
FEED CONTROL MEANS FOR MACHINE TOOLS.
APPLICATION FILED JULY 10, 1915.

1,291,098.

Patented Jan. 14, 1919.
2 SHEETS—SHEET 1.

Inventor
William C. Osterholm.
by Chas. E. Lord Atty.

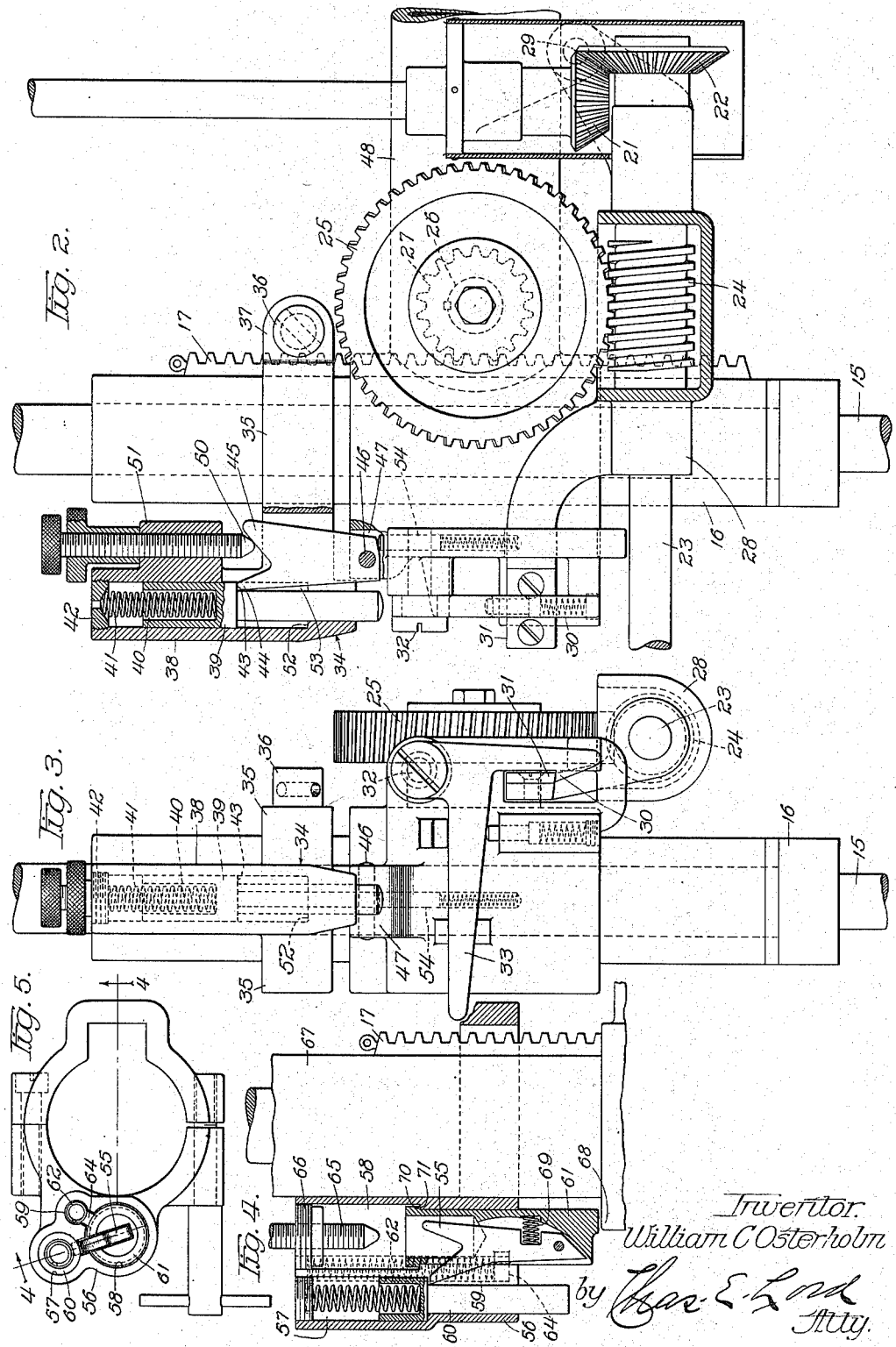

UNITED STATES PATENT OFFICE.

WILLIAM C. OSTERHOLM, OF CHICAGO, ILLINOIS, ASSIGNOR, BY MESNE ASSIGNMENTS, TO INTERNATIONAL HARVESTER COMPANY, A CORPORATION OF NEW JERSEY.

FEED-CONTROL MEANS FOR MACHINE-TOOLS.

1,291,098.   Specification of Letters Patent.   Patented Jan. 14, 1919.

Application filed July 10, 1915. Serial No. 39,152.

*To all whom it may concern:*

Be it known that I, WILLIAM C. OSTERHOLM, a citizen of the United States, residing at Chicago, in the county of Cook and State of Illinois, have invented certain new and useful Improvements in Feed-Control Means for Machine-Tools, of which the following is a full, clear, and exact specification.

This invention relates to feed control means for working tools, and more particularly to snap action or hammer blow attachments for controlling the feed of such tools.

In the operation of machines having cutting tools, such machines, for example, as drill presses, it is desirable to have the feed of the drill stopped automatically at the proper time. There are a large number of devices by means of which the feeding of the cutting tool is automatically stopped, but in such devices there is a gradual sliding and separating action between coöperating tripping parts, which, when eventually moved out of engagement with each other, causes the tripping of suitable mechanism to occasion the discontinuance of the feeding of the cutting tool. Where there is this continual gradual movement between the parts in question, there results a corresponding wearing away of the material of which said parts are made. This being true, it is apparent that the extent of movement of the cutting tool will be varied; for instance, if the ordinary automatic stop attachment is used in connection with the drill of a drill press, the gradual wearing away of the parts in question will cause the drill to enter the work a variable amount, which is unsatisfactory where it is desired that the drilled hole be of a certain depth.

It, therefore, is the main object of my invention to insure the feeding of a cutting tool a definite and constant amount for a given setting.

Another object is to cause a quick separation of certain power transmission parts affecting the feed of the cutting tool.

A further object is to provide an attachment for machines having feeding tools, which attachment is adapted to meet the requirements for successful commercial operation in connection with the use for which it is intended.

These and other objects are accomplished by providing machines having actuated cutting tools with a hammer blow or snap action attachment whereby the feeding action of the tool is discontinued sharply to cause the tool to be fed into the work a constant amount.

The invention is illustrated on the accompanying sheets of drawings, in which—

Fig. 2 is a side elevation, on a larger scale, parts being in section, of the feeding mechanism and hammer blow attachment;

Fig. 3 is a front elevation of the parts shown in Fig. 2;

Fig. 4 shows a modification of my hammer blow attachment secured to the tool supporting reciprocatory member of a drill press, the attachment being shown in section and taken in the plane of line 4—4 of Fig. 5; and Fig. 5 is a plan view of the parts shown in Fig. 4.

Figure 1:
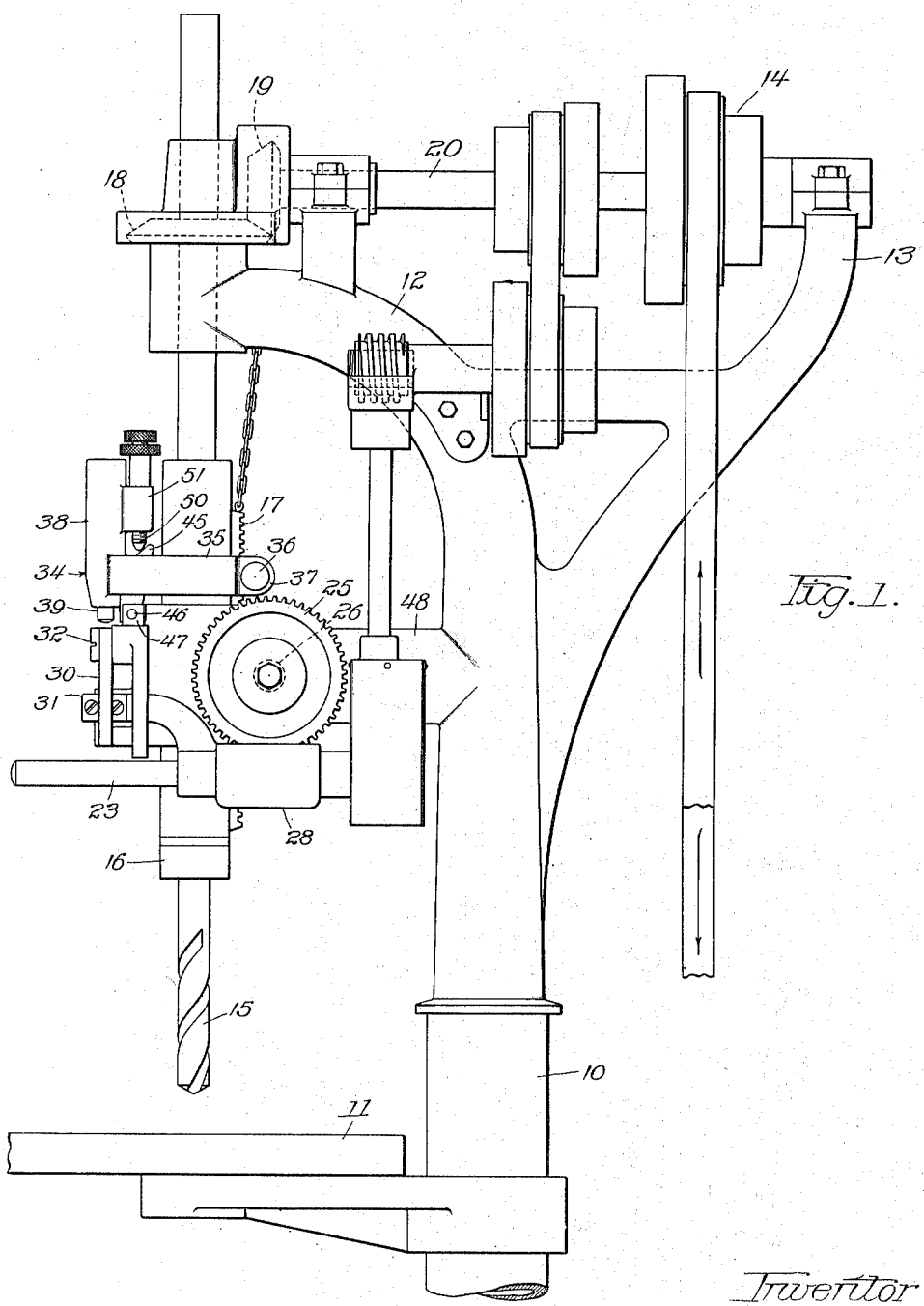
Figure 1 is a fragmentary side elevation of a drill press equipped with my invention.

The various novel features of my invention will be apparent from the following description and drawings, and will be particularly set forth in the appended claims.

For the sake of illustration, my invention is shown in connection with a drill press having a standard pedestal 10 and work support 11, said pedestal having arms 12 and 13, by means of which driving mechanism 14 is supported. The drill 15, or working tool proper, is located within a reciprocatory member 16 having a rack 17, said tool 15 receiving its rotary motion through intermeshing gears 18 and 19, the latter of which is mounted upon an actuating shaft 20. The reciprocatory member 16 receives its motion through the usual transmission mechanism, including intermeshing bevel gears 21 and 22, the latter being mounted upon one end of a shaft 23, having a worm 24 for driving a worm gear 25 mounted upon a shaft 26, upon which also is mounted a gear 27 meshing with the rack 17 of member 16. The worm 24 is rotatably supported in a bracket 28 pivotally mounted on a stationary part of the machine at a point 29 such that when the bracket 28 swings downwardly about said pivotal point 29, the worm 24 will pass out of mesh with the worm gear 25 while the gears 21 and 22 will remain in mesh without any cramping action.

Under normal feeding conditions the bracket 28 is locked in a substantially horizontal position to maintain a driving connection between the worm 24 and worm gear 25 by a latch 30 (see Fig. 3) which engages the under side of an arm 31 of the bracket 28. This latch is pivotally mounted at the point 32 to a stationary part of the machine and is provided with a laterally extending arm 33.

The mechanism thus far described is more or less standard. It is apparent from the description of these parts that if a member should be secured to the reciprocatory tool holder 16 and pass downwardly therewith, said member having a path of movement including the arm 33, said arm would gradually be pressed downwardly at the proper time for gradually moving the latch 30 away from the under part of the arm 31 of bracket 28. It is apparent, furthermore, that after the latch 30 has passed out of engagement with the arm 31 the bracket 28 would fall, due to its own weight, swinging about its pivotal point 29, thereby carrying the worm 24 out of engagement with the worm gear 25 for preventing further downward feeding movement of the rotary cutting tool 15. It has been found by experience that there is a gradual wearing away of the surfaces of the latch 30 and arm 31, which are in frictional engagement with each other and which have a relative motion. The wearing away of these engaging surfaces means that the tool will not pass into the work in which a hole is being drilled the same amount each time, but will be subject to variations caused by the wearing away of the frictional engaging surfaces of the latch 30 and arm 31. Where it is necessary that the drill enter the work just so far and no farther, it is of great importance that the feeding movement of the cutting tool be discontinued at the proper time. I have chosen to accomplish this result by means of a hammer blow, or snap action, attachment.

Referring to Figs. 1, 2 and 3, one form of my hammer blow attachment will be seen which includes a receptacle 34, having arms 35 which embrace the reciprocatory tool carrying member 16 and are securely clamped thereto by any suitable means, such as a screw 36 passing through threaded openings in ear portions 37 of said arms 35. Mounted within a cylinder 38 of this attachment is a plunger 39, having a thimble portion 40, in which is located the greater part of a spring 41, the end of said spring opposite the thimble abutting a removable cap 42 threaded into the end of the cylinder 38. This plunger 39 is the member which deals the hammer blow to the arm 33 for causing the latch 30 to disengage the arm 31 of the bracket to cause an immediate discontinuance of the feeding movement of the tool. As shown in Fig. 2 of the drawings, the annular shoulder 43 of the plunger is engaged by a projecting finger 44 of a cam 45 pivotally mounted at 46 to a stationary element 47 formed at one end of an arm 48 of the pedestal 10. Due to the fact that the cam 45 is mounted upon a stationary part of the machine and the balance of the attachment, including a cylinder 38 and plunger 39, mounted upon the movable or reciprocatory element 16 of the machine, the finger 44 of the cam 45 holds the plunger 39 in a fixed position as the cylinder 38 moves downwardly with the reciprocatory member 16, causing a certain amount of energy to be stored in the spring 41. Also, as shown in Figs. 1 and 2, a stud 50, adjustably mounted in a projection 51 formed on the cylinder 38, is in engagement with the cam 45. Under these conditions the movable element of the hammer blow attachment has moved downwardly a sufficient amount with the reciprocatory member 16 to cause a certain amount of energy to be stored in the spring 41 and to cause the stud 50 to pass into engagement with the cam 45 in a manner to withdraw the finger 44 from the shoulder 43 of the plunger. As the movable element of the attachment is moved downwardly from the position shown in Fig. 2, the stud 50 will cause the finger 44 to be withdrawn from the annular shoulder 43 in a manner to release the plunger 39. When the plunger is released, it descends rapidly under the influence of the stored energy in spring 41 and engages the arm 33 with a hammer blow, knocking the latch 30 with great rapidity from engagement with the arm 31 of bracket 28, resulting in the worm 24 immediately flying downwardly out of engagement with the worm gear 25 and thereby causing an immediate discontinuance of the downward feeding movement of the tool 15. When the feeding tool 15, with its reciprocatory member, is raised, the movable part of the attachment moves with it, annular shoulder 43 resting against stop portion 52 of the cylinder. When the cylinder 38 has moved upwardly a sufficient amount, the annular shoulder 43 will be engaged by the finger 44, which passes through a vertical slot 53 in the cylinder, the finger 44 being pressed into engagement with the shoulder 43 by a spring-pressed plunger 54, the stud 50 by this time having passed out of engagement with the cam 45. If now the cylinder 38, with its coöperating parts, should descend, it is apparent that the finger 44, which at this time is held under the annular flange 43, would hold the plunger 39 in a fixed position as the remaining elements, including the cylinder 38 and stud 50, continue to descend, whereupon an increased amount of energy would be stored in the spring 41. As described above, at the proper time the stud 50 engages with the cam 45 in a manner to release the plunger to deliver the hammer blow to prevent a further feeding movement of the tool. By means of this hammer blow attachment, the feeding movement of the cutting tool can be accurately controlled, and such control is independent of the wearing of any of the parts; such, for example, as the latch 30 and the arm 31. The time of tripping of the plunger may be varied by adjusting the stud 50 so that the drill or any other cutting tool may be fed to the desired amount and accurately controlled.

In Figs. 4 and 5, I have shown a modification of my invention, in which the complete attachment is self-contained; that is to say, that the cam member 55 corresponding to cam 45 (Figs. 1, 2 and 3) is mounted within the movable casing 56 of the attachment, which is secured to the reciprocatory member in which the tool is mounted. It will be noted, by referring to Fig. 5, that this casing 56 has three vertical openings 57, 58 and 59, the first containing the plunger 60, the second containing another plunger 61, in which the cam member 55 is pivotally mounted, and in the third 59 of which is a spring 62 which engages with a laterally extending ear 64 of the plunger 61. The opening 58 also receives a stud 65 adjustably mounted in a cap 66 threaded into the upper part of opening 58 in the casing 56. As shown in Fig. 4, the reciprocatory member 67 has passed downwardly to the point where the plunger 61 is about to engage with the stationary part 68 of the machine. When the plunger 61 does engage with the part 68 of the machine, it will be held stationary while the casing 56 of the attachment continues to descend, the plunger 61 being held against downward movement by the cam 55, as described heretofore, for storing energy in the spring backing it. At the same time the stud 65 approaches the cam member 55 for releasing the plunger for the desired purpose. The stud 65, in withdrawing the cam 55 for releasing the plunger, acts in opposition to a spring 69 which is mounted in the plunger 61 and interposed between the wall thereof and the cam member 55. The plunger 61 is movable in the casing 56 and, as shown, is held in one extreme position with its annular shoulder 70 engaging the shoulder 71 formed on the inside of the casing 56 due to the action of the spring 62. However, the action of this spring is overcome by the downward movement of the casing 56, permitting the casing 56 to move down over the plunger 61, whereupon the stud 65 passes into engagement with the cam member for releasing the hammer blow plunger 60.

This self-contained attachment, as well as the one disclosed in Figs. 1, 2 and 3 of the drawings, while shown in connection with a drill press, is not limited to such use, for it may be attached to machines of various natures in which the feeding of a cutting tool is to be accurately controlled.

It is evident that there may be various modifications of my invention as here particularly shown and described, and it is my intention to cover all such modifications which do not involve a departure from the spirit and scope of said invention as set forth in the following claims.

What I claim as new is:

1. In combination, a work tool, feeding means therefor, means for normally maintaining a driving connection between said tool and said feeding means, and means associated therewith for delivering a hammer blow to break said driving connection.

2. In combination, a work tool, means for feeding the tool, a plunger associated therewith for delivering a hammer blow to control a feeding movement of said work tool, means for holding said plunger inoperative during the feeding movement of said tool, and means for releasing said holding means.

3. In combination, a work tool, means for feeding the tool, a plunger associated therewith for delivering a hammer blow to control a feeding movement of said work tool, means for holding said plunger inoperative during the feeding movement of said tool, and cam means for releasing said holding means.

4. In combination, a work tool, means for feeding the tool, a plunger associated therewith adapted to deliver a hammer blow to control the feed of said work tool, a member for holding said plunger inoperative for a certain length of time, and means for engaging said member to release said holding means.

5. In combination, a work tool, means for feeding the tool, a plunger associated therewith adapted to deliver a hammer blow to control the feed of said work tool, a member for holding said plunger inoperative for a certain length of time, and means movable with said tool for engaging said member to release the same.

6. In combination, a work tool, means for feeding the tool, a plunger associated therewith for delivering a hammer blow to control the feed of said tool, means for holding said plunger inoperative during a certain period, means for engaging said holding means for releasing said plunger, and means for varying the time of release of said holding means.

7. In combination, a work tool, means for feeding the tool, and a hammer blow attachment movable with said tool for controlling the feed thereof.

8. In combination, a work tool, means for feeding the tool, a hammer blow attachment movable with said tool for controlling the feed thereof, and means for controlling the time of action of said hammer blow attachment.

9. In combination, a work tool, means for feeding the tool, a casing mounted to reciprocate therewith, a plunger mounted in said casing, means for retaining said plunger in a fixed position during a portion of the reciprocatory movement of said work tool, and means carried by said casing for releasing said plunger for stopping the feeding action of said work tool.

10. In combination, a work tool, means for feeding the tool, a casing movably mounted to reciprocate therewith, a spring-pressed plunger mounted in said casing, a cam member for holding said plunger against movement, and means for engaging said cam member to release said plunger to deliver a hammer blow for stopping feeding movement of said tool.

11. In combination, a work tool, means for feeding the tool, a casing movably mounted to reciprocate therewith, a spring-pressed plunger mounted in said casing, a cam member for holding said plunger against movement, and adjustable means for engaging said cam member to release said plunger to deliver a hammer blow for stopping feeding movement of said tool.

12. A hammer blow attachment for work tools including a plunger, means normally held in the path of movement of said plunger for preventing operative movement thereof during an operative movement of the tool, and means for actuating said holding means to release said plunger.

13. A hammer blow attachment for work tools including a plunger, a cam member normally in the path of movement of said plunger for holding the same against movement, means for yieldingly pressing said cam member in a holding position, and means adapted to engage said cam member for releasing said plunger.

14. A hammer blow attachment for work tools including a plunger, a cam member normally in the path of movement of said plunger for holding the same against movement, means for yieldingly pressing said cam member in a holding position, and adjustable means adapted to engage said cam member for releasing said plunger.

15. A hammer blow attachment for work tools including a casing having a plurality of openings therein, a plunger in one of said openings for delivering a hammer blow, and a reciprocatory member in said other opening for holding said plunger inoperative for a predetermined time.

16. A hammer blow attachment for work tools including a casing having a plurality of openings therein, a plunger in one of said openings for delivering a hammer blow, a reciprocatory member in said other opening for holding said plunger inoperative for a predetermined time, and means engaging said holding means for releasing said plunger.

17. A hammer blow attachment for work tools including a casing having a plurality of openings therein, a plunger for delivering a hammer blow mounted in one of said openings, a plunger in another one of said openings having a member normally extending into the path of movement of said first plunger to hold the latter inoperative, and means for engaging said holding member for releasing said plunger.

18. In combination, a work tool, means for feeding the same, means for connecting said feeding means and said work tool, and a hammer blow attachment for controlling said connecting means with a snap action.

In testimony whereof I affix my signature, in the presence of two witnesses.

WILLIAM C. OSTERHOLM.

Witnesses:
Le Roy B. Andersen,
C. H. Burns.